Dec. 27, 1966  E. W. ROBERTSON  3,294,142
PNEUMATICALLY EXPANDABLE TIRE CASING MOUNTING
Filed May 19, 1965
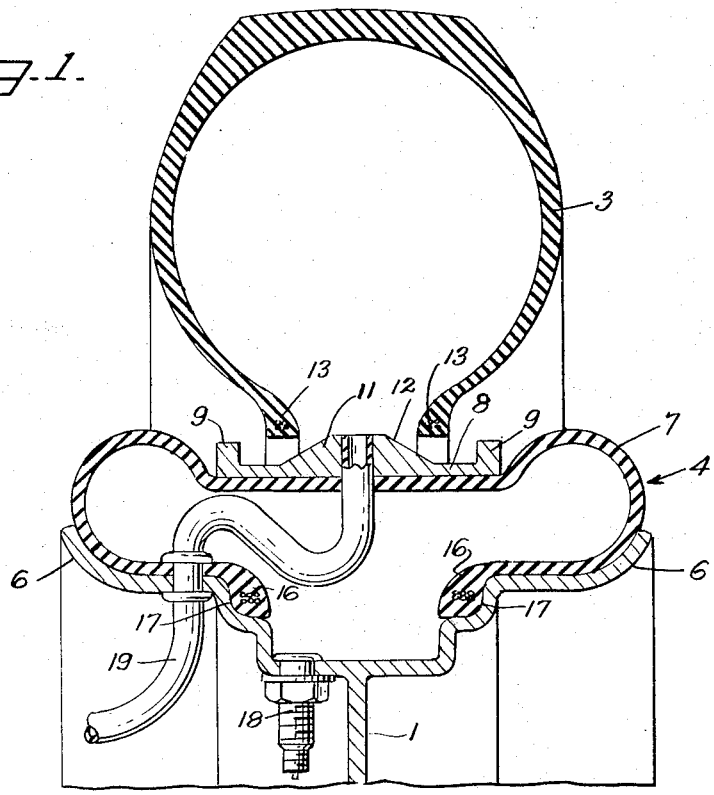
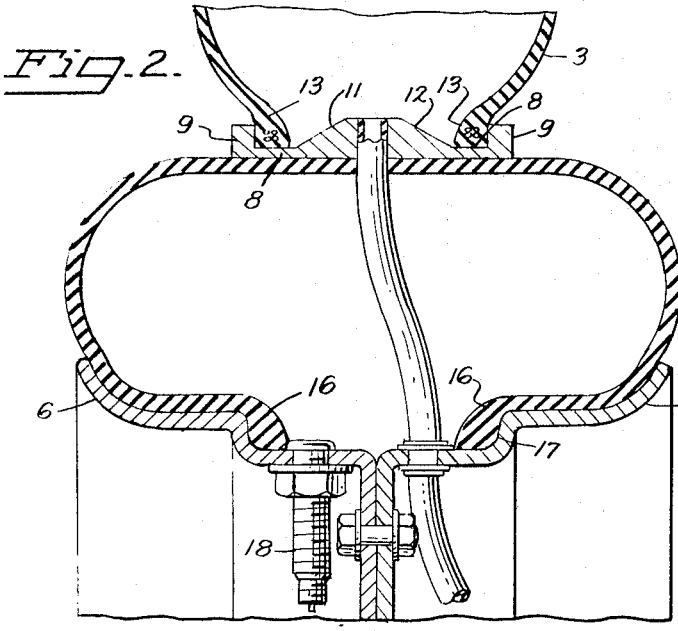
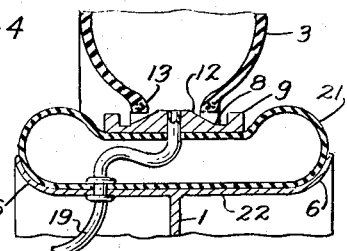
INVENTOR
ELMER W. ROBERTSON
BY George B White
ATTORNEY 3,294,142
PNEUMATICALLY EXPANDABLE TIRE
CASING MOUNTING
Elmer W. Robertson, 6965 Park Blvd.,
Oakland, Calif. 94611
Filed May 19, 1965, Ser. No. 456,959
7 Claims. (Cl. 152—339)

This invention relates to a pneumatically expandable tire casing mounting.

The primary object of the invention is to provide a pneumatically expandable rim, pre-loaded, so as to exert radial outward pressure on the beads of a tire casing for firmly mounting the tire casing, thereby to permit the inflation of the tire casing and the mounting of it for various operations such as for buffing, for building rubber on the outer periphery, for checking leaks of tubeless tires, and the like.

Another object of the invention is to provide a pneumatically expandable rim whereby a wheel of fixed diameter is enabled to handle tire casings of several bead diameters within the range of the inflatability of the outer rim.

Another object of the invention is to provide a comparatively heavy and stiff rib between flanges so as to form the crown of the inflatable rim and to guide the beads of the tire casing against side flanges, and to provide stretch resistance about the middle of the crown of the inflatable rim, and to prevent the outer periphery of the inflatable rim from crowding at the center under pneumatic pressure into the cavity between the beads of the tire casing.

A further object of the invention is to provide an inflatable rim which co-operates with the flanges or dished peripheral sides of the wheel rim to preload the inflatable rim thereby to inhibit lateral expansion during inflation so as to direct the pneumatic expanding force radially outwardly.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a cross sectional view of the inflatable rim on a wheel rim with a tire casing thereon in relaxed position.

FIG. 2 is a fragmental sectional view showing the expandable rim expanded against engaging beads of the tire casing on a two piece wheel.

FIG. 3 is a fragmental cross sectional view of a modified form of the expandable rim.

In handling of the tire casings for various operations, the tire casing must be mounted on a wheel, which latter is usually mounted on a suitable shaft, spindle or support for rotation. For this purpose there is utilized a wheel 1 on the fixed rim 2 of which is to be mounted the tire casing 3.

In the herein invention a pneumatically expandable tube 4 is mounted on the fixed wheel rim 2, and the tire casing 3 is mounted on the outer periphery of the pneumatic tube 4.

For the purpose of the herein invention, the fixed rim 2 of the wheel 1 is suitably dished so as to form upwardly curved annular side flanges 6 which partly overlap the side bulges 7 of the pneumatic tube 4. The pneumatic tube 4 has on its outer periphery a comparatively heavy and stiff crown 8, which in the present illustration is made of heavy rubber and is expandable radially but is stiff transversely.

The crown 8 has a pair of spaced annular flanges 9 projecting radially outwardly. A stiffener rib 11 is formed around the middle of the crown 8 between the flanges 9. The rib 11 is of frusto-conical or substantially pyramidal cross section. The rib 11 maintains the crown 8 substantially flat across the tube periphery and prevents crowning when the tube is inflated.

The inclined sides 12 of the rib 11 incline at a suitable angle toward the base of the crown 8 to gradually increase the resistance to crowning and also to guide beads 13 of the tire casing 3 outwardly and against the inner faces of the respective flanges 9.

In the present illustration the dished rim 2 of the wheel 1 has a bead engaging recess 14 formed therein, and the inflatable tube 4 is made with suitable beads 16 which engage shoulders 17 of the wheel rim recess 14 as shown in FIGS. 1 and 2.

A suitable inflating valve 18 is provided at the bottom of the fixed rim 2 for inflating the expandable tube rim 4. A conduit 19 extends through a side of the wheel rim 2, then through the inside of the inflatable tube and through rib 11 of the crown 8 for conducting air under inflating pressure into the tire casing 3.

The stiffener crown 8 is narrower than the width of the inflatable rim 3 and is of smaller contracted diameter than the outer diameter of the pneumatic tube 4 in deflated attitude, so that the stiffner crown 8 forces the middle portion of the deflated tube 4 radially inwardly thereby to form the bulges 7. The restraining flanges 6 prevent the inflated tube 4 from crawling to one side or the other on the wheel rim 2 and thus hold the crown of the tube 4 on true center on the wheel rims. The flanges 6 bearing against the sides of the tube 4 compress and preload the bulges 7 sufficiently to lend to the tube 4 lateral rigidity when inflated. Thus the sides of the tube 4 remain in contact with the flanges 6 throughout the expansion of the tube 4.

In the modified form shown in FIG. 3, the expandable rim is a complete tube 21. The dashed fixed rim 22 of this form has a continuous transversely flat bottom without a recess, and the tube 21 nestles in the dished rim 22 and is held preloaded by the curved side flanges 6 heretofore described.

In operation the wheel 1 with the expandable rim 4 or 21 thereon is located within the inner periphery of the beads 13 of the tire casing 3. Then the expandable rims 3 or 21 is inflated. By reason of the laterial preloading and restraint by the rim flanges 6, the tube expands radially outwardly so as to press the stiff crown 8 toward the beads 13 of the tire casing 3. Upon further expansion, the tire beads 13 centered by the sides 12 of the rib 11 are forced laterally against the inner faces or corners of the crown flanges 9 and are firmly held while the tire casing 3 is inflated suitably for the desired operation. The expandable rim is thus properly centered on the fixed rim 2 of the wheel 1 and properly centers the tire casing 3 thereon. The operation is positive, lateral displacement and misalignment are obviated, and the fixed rim is adapted to handle tire casings of various diameters within the limit of expandability of the expandable rim.

I claim:

1. In a pneumaticaly expandable mounting for tire casings of several bead diameters
   (a) a wheel, (b) a dished rim on the wheel,
(c) an inflatable radially expandable rim nested in said dished rim,
(d) restraining means on said dished rim engaging the sides of said inflatable rim thereby to restrain lateral expansion of the sides of said inflatable rim, and to center and preload said sides thereof,
(e) a radially expandable stiffener crown fixed around the outer periphery of said inflatable rim, being transversely stiff, thereby to prevent crowning, and being contractable radially inwardly to be insertable in tires of several bead diameters,
(f) means on said crown for engaging and limiting the lateral relative movement of the beads of a tire casing on said crown when said inflatable rim is inflated and radially expanded.

2. In a pneumatically expandable tire casing mounting
(a) a wheel,
(b) a dished rim on the wheel,
(c) an inflatable radially expandable rim nested in said dished rim,
(d) restraining means on said dished rim to restrain lateral expansion of said inflatable rim, and to center and preload the sides thereof,
(e) a radially expandable stiffener crown fixed around the outer periphery of said inflatable rim, being transversely stiff, thereby to prevent crowning,
(f) means on said crown for engaging the beads of a tire casing when said inflatable rim is inflated and radially expanded,
(g) said stiffener crown being of such diameter that it contracts radially inwardly, when the inflatable rim is deflated, to a diameter less than the diameter of the outside periphery of said inflatable rim, thereby to form annular bulges around the opposite sides of said inflatable rim,
(h) said restraining means overlapping around the outside faces of the respective bulges thereby to precompress said bulges.

3. In a pneumatically expandable tire casing mounting
(a) a wheel,
(b) a dished rim on the wheel,
(c) in inflatable radially expandable rim nested in said dished rim,
(d) restraining means on said dished rim to restrain lateral expansion of said inflatable rim, and to center and preload the sides thereof,
(e) a radialy expandable stiffener crown fixed around the outer periphery of said inflatable rim, being transversely stiff, thereby to prevent crowning,
(f) means on said crown for engaging the beads of a tire casing when said inflatable rim is inflated and radially expanded,
(g) said bead engaging means being spaced, radially outwardly projecting annular flanges on said crown,
(h) a reinforcing band projecting from and around the middle of said crown between said annular flanges to prevent the bulging of said crown,
(i) inclined sides of said band gradually increasing the stiffness of said band toward the middle thereof and slanting toward said flanges respectively to guide the beads of a tire casing against said flanges.

4. In a pneumatically expandable tire casing mounting defined in claim 1,
(g) said restraining means being laterally and radially outwardly curved side flanges around the opposite sides of said wheel, and projecting radially outwardly thereby to overlap the sides of said inflatable rim,
(h) said inflatable rim when deflated fitting into said dished rim with the sides of said inflatable rim bearing laterally against said curved side flanges so as to be held precompressed by said flanges.

5. In a pneumatically expandable tire casing mounting,
(a) a wheel,
(b) a dished rim on said wheel,
(c) radially and laterally curved restraining flanges around opposite sides of said rim,
(d) a tube nesting in said dished rim fitting in deflated condition against said restraining flanges, so as to be precompressed thereby,
(e) a resiliently expandable mounting crown around the middle of the periphery of said tube being of smaller contracted diameter than the outer diameter of the deflated tube thereby to urge the middle of the tube radially inwardly so as to form a preloaded bulge around each side of said tube and against said respective flanges,
(f) bead engaging means on said mounting crown for engaging the beads of a tire casing,
(g) control means for the inflation of said tube,
(h) means extended through said tube and through said crown to conduct inflating air into the tire casing on said mounting band.

6. In a pneumatically expandable tire casing mounting defined in claim 5, and
(h) a recessed bottom around the middle of said dished rim forming bead engaging shoulders,
(i) beads on said tube for engaging said bead engaging shoulders.

7. In a pneumatically expandable tire casing mounting defined in claim 5, and
(h) a reinforcing band around and projecting from said mounting crown to stiffen said mounting crown,
(i) inclined sides on said reinforcing band to gradually increase the stiffness of the crown toward the middle thereof and to guide the beads of a tire casing to said bead engaging means.

References Cited by the Examiner

UNITED STATES PATENTS

| | | | |
|---|---|---|---|
| 2,231,745 | 2/1941 | Altmyer | 152—9 |
| 2,618,308 | 11/1952 | Khalil | 152—339 |
| 2,955,636 | 10/1960 | Gray | 152—340 |

ARTHUR L. LA POINT, *Primary Examiner.*

C. W. HAEFELE, *Assistant Examiner.*